LINE SEQUENTIAL COLOR DISPLAY SYSTEM

Filed March 31, 1967 3 Sheets-Sheet 1

May 12, 1970 G. E. GOODE 3,511,924

LINE SEQUENTIAL COLOR DISPLAY SYSTEM

Filed March 31, 1967 3 Sheets-Sheet 2

United States Patent Office 3,511,924

Patented May 12, 1970

3,511,924

LINE SEQUENTIAL COLOR DISPLAY SYSTEM

George E. Goode, Richardson, Tex., assignor to Texas Instruments Incorporated, Dallas, Tex., a corporation of Delaware Filed Mar. 31, 1967, Ser. No. 627,379
Int. Cl. H04n *9/16*
U.S. Cl. 178—5.4 9 Claims

ABSTRACT OF THE DISCLOSURE

In an illustrated embodiment of the invention providing a three color display, electron beams from a pair of electron guns are swept together across a phosphor screen. The beams impinge upon and excite the phosphor screen at respective zones which overlap one another to an extent such that the number of electrons from each beam impinging within the overlapping portion of the respective zone is substantially equal to one-half the number from that beam impinging within the remainder of the respective zone. As the beams are swept across the screen, the non-overlapping portions of the zones form respective sets of raster lines and the overlapping portions effectively provide a third set of raster lines interposed between the sets formed by the non-overlapping portions. The color of the light emitted by the screen is changed on successive lines and the electron beams emitted by the two electron guns are modulated by related signals so that three lines of the same color are produced on each sweep. The number of lines of each color is thus substantially equal to the number of sweeps made even though three different colors are presented on a line sequential basis.

BACKGROUND OF THE INVENTION

This invention relates to a color display system and more particularly to a line sequential color display system.

Line sequential color displays known heretofore typically operate by scanning a single line of a first color and then a single line of a second color, etc., so that the number of lines of each color is only equal to the number of scans divided by the number of colors employed. The relatively small number of lines of each component color has thus caused a reduction in vertical resolution and an objectionable lined quality in the composite multicolor image.

SUMMARY OF THE INVENTION

Among the several objects of the present invention may be noted the provision of a line sequential color kinescope display system in which the number of lines of each color is substantially equal to the number of scans; the provision of such a system in which the image produced does not have an objectionable lined quality; the provision of such a system which requires only two electron guns to provide a three color display; the provision of such system which is reliable; and the provision of such a system which is relatively simple and inexpensive. Other objects and features will be in part apparent and in part pointed out hereinafter.

Briefly, a color display system according to the present invention provides a display in a plurality of different colors in response to respective color records. Light of a selected color is generated on a viewing screen at a pair of zones which are partially overlapping and which are offset from one another in one direction along the screen. The amount of light generated within the overlapping area is substantially equal to the average of the amounts of light generated within the non-overlapping portions of the respective zones. The zones are repetitively swept together across the screen. The non-overlapping portions of the zones form respective sets of raster lines extending transversely to the direction in which the zones are offset from one another along the screen and the overlapping portions effectively provide a third set of raster lines interposed between the sets formed by the non-overlapping portions.

The color of the light generated on the screen is changed on successive line sweeps. The intensity of the light generated in one of the zones is modulated in accordance with respective ones of the records on successive line sweeps thereby to display the records in their respective colors. Simultaneously, the intensity of the light generated in the other of the zones is modulated in accordance with a signal derived from and related to the record then being displayed by the one gun. Accordingly, each line sweep effectively produces three lines of the same color all of which are derived from the same record and successive sweeps produce respective triplets of lines of respective colors.

BRIEF DESCRIPTION OF THE DRAWINGS

Corresponding reference characters indicate corresponding parts throughout the several views of the drawings.

DESCRIPTION OF THE PREFERRED EMBODIMENTS

Figures 1, 1A:
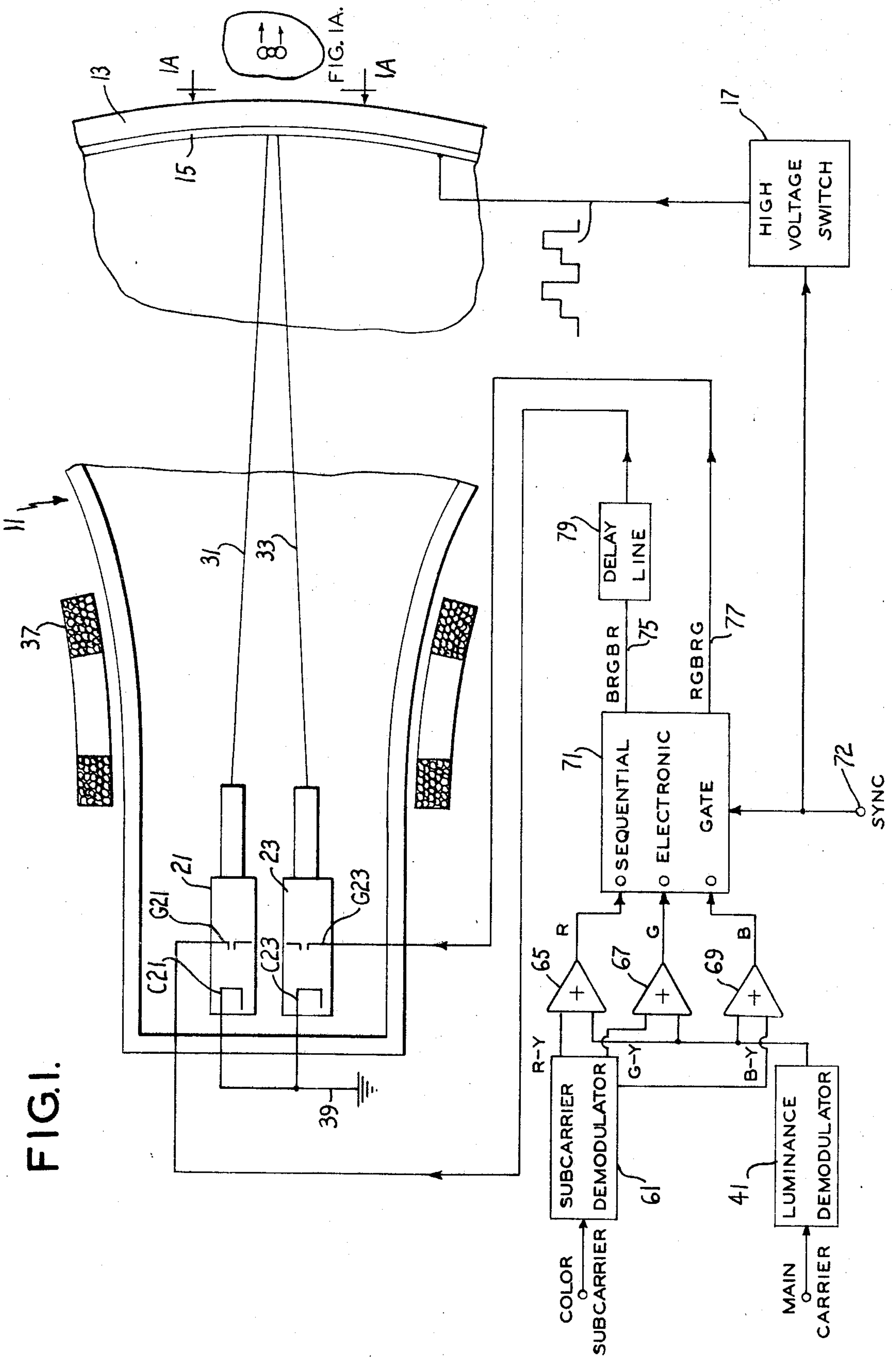
FIG. 1 is a partially diagrammatic illustration of a color display system of this invention employing a kinescope having a pair of electron guns.
FIG. 1A is an enlarged fragmentary view of the face plate of the kinescope of FIG. 1 taken on the line 1A—1A.

Referring now to FIG. 1, there is indicated generally at 11 a color kinescope as employed in the present invention. Kinescope 11 includes a glass face plate 13 on the interior surface of which is deposited a phosphor screen 15. Phosphor screen 15 is preferably of the type generally disclosed in Pat. No. 3,372,229, issued Mar. 5, 1968 and assigned to the same assignee as the present invention, comprising a mixture of various phosphors which emits light of different colors in response to impinging electrons of different energies. The color of the light emitted by such a screen may be selectively controlled by varying the energy or accelerating voltage applied to electrons which excite the phosphors. For this purpose a stepped or so-called "staircase" accelerating voltage is applied to screen 15 by a high voltage switch indicated at 17. High voltage switch is operated in conjunction with the scanning of screen 15 as described hereinafter to change the color of the light emitted by the screen on successive lines thereby providing a line sequential mode of operation.

Kinescope 11 also includes a pair of electron guns as represented diagrammatically at 21 and 23, these guns being considered hereinafter as the upper gun and the lower gun respectively. Each of the guns 21 and 23 includes a respective electron emissive cathode C21 and C23 and a respective grid G21 and G23 for modulating the beam current or number of electrons emitted from the gun as an electron beam. The cathodes are grounded as indicated at 39. The apertures of grids G21 and G23 are shaped so that the zones on screen 15 which are excited by the respective electron beams are of non-circular configuration and are of substantially complementary or "mirror image" configurations as described in greater detail hereinafter.

Figures 2A, 2B, 2C:
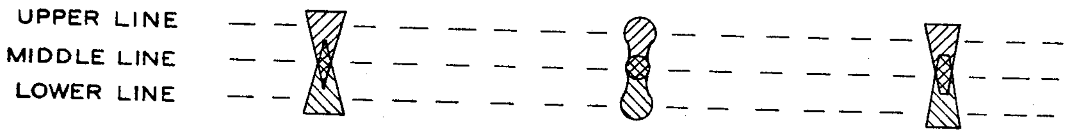
FIGS. 2A, 2B and 2C are views of the faceplate illustrating alternative configurations for the respective zones excited by the beams emitted by the two electron guns.

Guns 21 and 23 are aimed so that the respective electron beams 31 and 33 emitted thereby strike screen 15 at respective zones which are offset from one another along the screen in the vertical direction but overlap partially (see FIG. 1A). The zones excited by the respective electron beams 31 and 33 are shaped, e.g., by the configuration of the respective grid apertures as mentioned previously, so that the area of the overlapping portion of each zone is substantially equal to one-half of the area of the remainder of the zone. Various configurations of the zones which produce this result are illustrated in FIGS. 2A, 2B and 2C. In FIG. 2A each of the beams excites a zone which is substantially triangular in shape, the triangles being oppositely oriented so that pointed portions thereof overlap. In FIG. 2B each of the zones is of a "figure eight" configuration having a small lobe which is substantially one-half the area of the large lobe. The small lobes overlap each other. In FIG. 2C the zones are of trapezoidal shape having narrow ends overlapping so that the overlapping area of each zone is equal to one-half the area of the non-overlapping area of that zone. A vertically elongated spot having the desired average electron distribution characteristics may also be produced by applying a high frequency vertical scanning signal or a magnetic field to defocus the beams in the vertical direction.

Assuming that each zone receives electrons substantially uniformly over its entire area, the overlapping portion of each zone will receive from its respective gun substantially one-half the number of electrons received by the remainder of that zone. Accordingly, the total number of electrons falling within the common overlapping area is substantially equal to the average of the numbers falling within the non-lapping portions. Assuming that the amount of light emitted is generally proportional to the number of electrons impinging, the brightness of the overlapping area is substantially equal to the average of the brightnesses of the two non-overlapping areas. Other methods of producing overlapping zones of light on a viewing screen may also be used.

Figure 3:
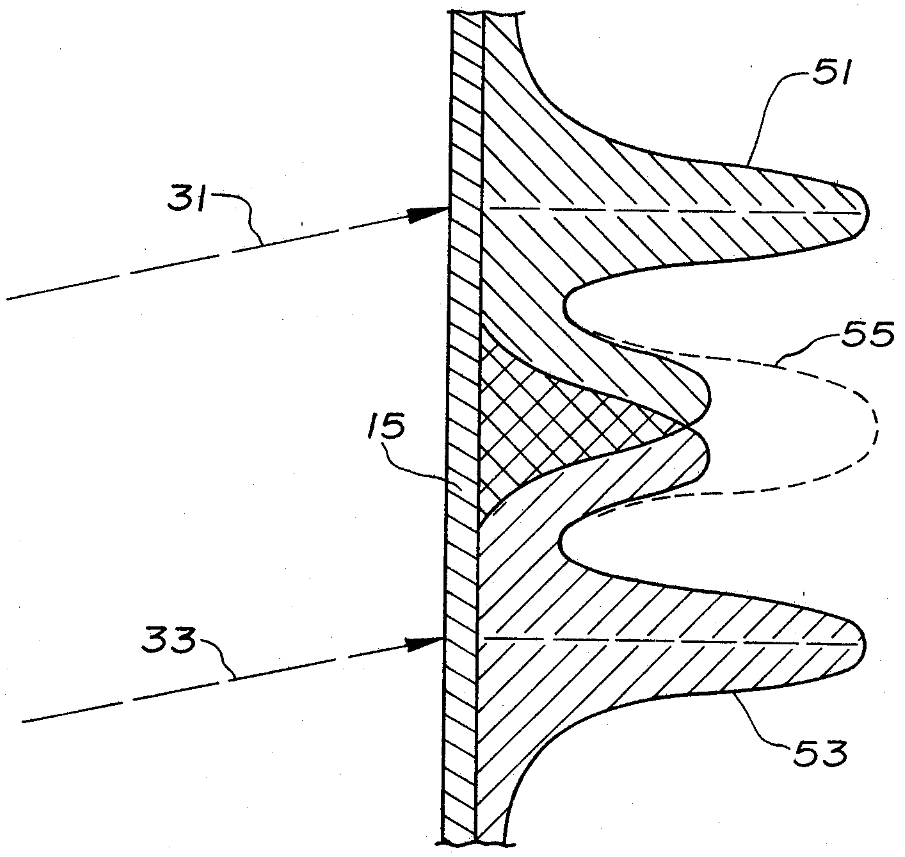
FIG. 3 illustrates the electron distribution for two overlapping beams each having non-uniform electron distribution.

Referring to FIG. 3, a side view of a phosphor screen 15 is shown with the electron distribution profile for typical non-uniform beams 31 and 33. Curve 51 and the cross-hatched area bounded thereby is the electron distribution for beam 31, and curve 53 and the cross-hatched area bounded thereby is the electron distribution for beam 33. Upper and lower raster lines are defined by beams 31 and 33, respectively; and the overlapping portions of beams 31 and 33 cumulatively define a middle raster line as shown by the net electron distribution illustrated by the dotted line 55. Thus, it is seen that the two non-uniform beams 31 and 33 define three raster lines with the middle raster line resulting from the additive effect of the overlapping portions of the two beams. Since the electron distribution for the overlapping portion of each beam is about one-half the electron distribution for the non-overlapping portion of the beam, the net electron distribution for the middle line will be approximately the average of the upper and lower lines. The overlapping portion of the beams need not be in perfect alignment for satisfactory averaging of the upper and lower beams since a certain amount of spatial averaging is performed by the human eye.

A magnetic deflection yoke 37 is provided for sweeping the beams 31 and 33 together across screen 15 under the control of conventional horizontal and vertical sweep circuitry (not shown). Guns 21 and 23 are physically positioned close to one another so that there is only a slight deviation from parallelism between the beams 31 and 33. As the beams are scanned by yoke 37, the non-overlapping portion of each of the respective zones forms a respective set of horizontal raster lines extending transversely to the vertical direction in which the two zones are offset from one another. The overlapping portions of the zones effectively provide a third set of raster lines which are interposed between the respective sets of raster lines formed by the non-overlapping portions of the zones. The brightness of the third set of raster lines is, at each point, substantially equal to the average of brightnesses of the respective lines formed by the non-overlapping portions of the beams. Each horizontal scan of the pair of electron beams thus effectively produces three rather than two raster lines. Since the three lines are all produced simultaneously, all three lines will be of the same color depending upon the accelerating voltage then being applied to screen 15.

The system illustrated in FIG. 1 is arranged to the NTSC system which is standard in this country. The system includes a luminance demodulator 41 for obtaining the conventional luminance or Y signal. The color subcarrier is synchronously demodulated as indicated at 61 to provide the chrominance signals R–Y, G–Y and B–Y. The luminance signal is then combined with each of the chrominance signals in a respective summing network 65, 67 and 69, respectively, to obtain R, G and B color signals which comprise component color records of a scene to be displayed. These color signals are applied to a sequential electronic gate 71.

Gate 71 is operated under control of a conventionally derived horizontal synchronization signal, applied at a terminal 72, to sequentially pass selected ones of the color signals to provide a pair of line sequential control signals at leads 75 and 77 respectively. Each of the sequential control signals represents a different color during each successive line-scan interval. The various color signals are applied to leads 75 and 77 by a gate 71 in the same order but with different timing so that there is a one-line time displacement between the sequences of these signals. This is indicated by the one character lateral offsetting of the RGB characters shown in the drawing adjacent these lines.

The signal provided at lead 75 is applied to a delay line 79 which introduces a delay in this signal equal to one line sweep period. The signal provided at the output of the delay line thus, at each instant, contains information representing the same color as that carried by the lead 77 but taken from the preceding line. In other words, the delayed signal is derived from and related to the same color record as the signal at lead 77. The signal taken from delay line 79 is applied to the upper gun 21 and the undelayed signal at line 77 is applied to the lower gun 23. While, in the embodiment illustrated, a pair of related signals comprising color record information representing the same color are obtained by means of a delay system, such pairs may be provided directly by the signal originating equipment if other than an NTSC transmission system is employed.

On any given sweep of the beams 31 and 33, the electron accelerating voltage applied to screen 15 is the same for both beams and thus the electrons from both guns produce light of the same color. The operation of high voltage switch 17 is synchronized by the same signal as the gate 71 so that the color of the light emitted by screen 15 is changed on successive line sweeps in correspondence with the color signals being applied to the guns 21 and 23. Thus, each of the color signals are displayed in light of an appropriate color.

Figure 4:
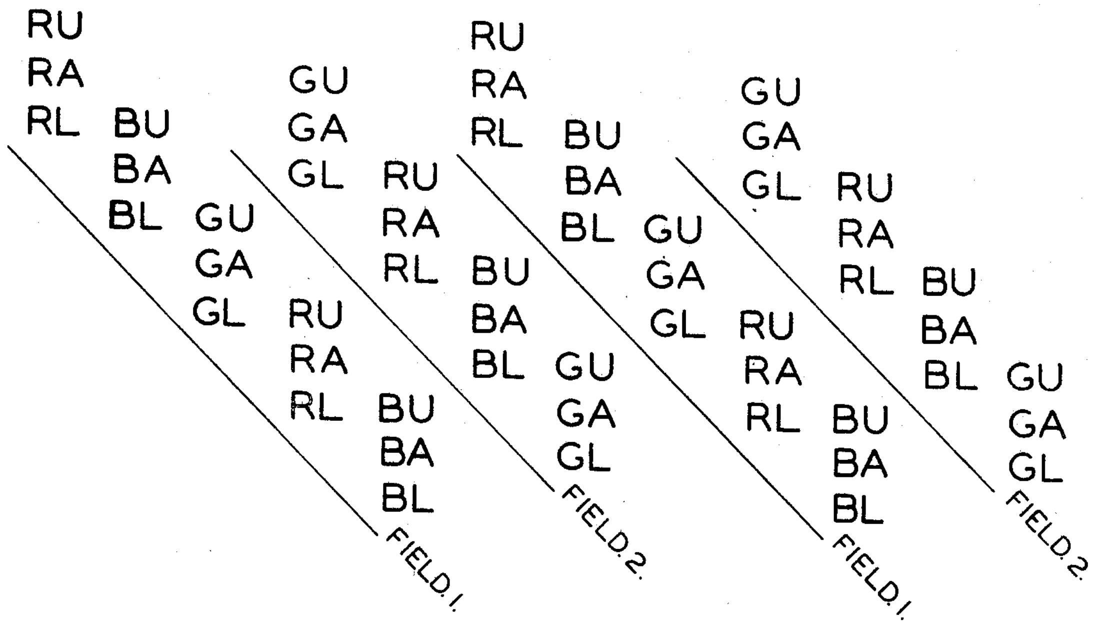
FIG. 4 is a chart representing the scanning pattern of the electron guns of the system of FIG. 1.

The vertical spacing between successive scan lines is preferably adjusted in relation to the offset between the respective zones produced by guns 21 and 23 so that the line formed by the upper gun during each scan falls on top of the line formed by the lower gun on the preceding sweep. The effect of this scanning pattern is illustrated in the chart of FIG. 4 in which each line formed by the beams is represented by a pair of leters. The first letter in each pair is indicative of the color of that line, e.g., R for red, B for blue and G for green. The second letter in each pair is indicative of the source of that line. Thus U indicates a line formed by the non-overlapping portion of the zone excited by the upper gun 21, L indicates a line formed by the non-overlapping portion of the zone excited by the lower gun 23 and A indicates a line formed by the overlapping portions of both zones, the brightness of this line being, at each point, substantially equal to the average of the brightnesses of the other two lines in that triplet of lines. Thus, as illustrated, the first scan produces three red lines RU, RA and RL. The second scan produces three blue lines BU, BA and BL, the line BU falling on top of the line RL. A third scan produces three green lines, GU, GA and GL, the first of which (GU) falls on top of the last line (BL) of the preceding scan. This sequence repeats until a full field has been scanned.

When the first field is finished, the second field is scanned starting with the three green lines GU, GA and GL. Since the second field in the NTSC system of image transmission is interlaced or staggered in vertical position with respect to the first field, the first green line GU falls on top of the second red line RA of the preceding field. The second field is scanned in the same color sequence as the first field, again with the top line of each three lines of the same color falling on the bottom line of the lines in the preceding color. When the second field is finished, the scanning and color signal switching sequence repeats so that the next field contains lines of the same color in the same vertical positions as the first field.

From FIG. 4 it can be seen that, for each pair of fields, there is a red line, a blue line and a green line indicated on each vertical line of the chart, and that the number of lines of each color is thus substantially equal to the number of scans when considered or averaged over at least a pair of fields. Further, since the production of light of each color is distributed substantially uniformly in the vertical direction, the display does not have an objectionable line appearance.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A color display system for providing a display in three colors in response to respective color signals, said system comprising:

- a viewing screen;
- means for generating light of a selected color in a pair of zones on said screen, said zones being partially overlapping and offset from one another in one direction along said screen, the total amount of light generated within the overlapping area being equal to the average of the amounts of light generated within the non-overlapping portions of the respective zones;
- means for repetitively sweeping both of said zones together across said screen whereby the non-overlapping portions of said zones form respective sets of raster lines extending transversely to said one direction with the overlapping portions of said zones effectively providing a third set of raster lines interposed between said respective sets of raster lines, the brightness of said third set of raster lines being substantially equal to the average of the brightnesses of said respective sets of raster lines;
- means for changing on successive line sweeps the color of the light generated; and

- means for modulating the intensity of the light generated in one of said zones in accordance with respective ones of said color signals on successive line sweeps thereby to display said color signals in their respective colors and for simultaneously modulating the intensity of the light generated in the other of said zones in accordance with a signal derived from and related to the color signal then being displayed by said one zone whereby each line sweep effectively produces three lines of the same color on said screen all of which are derived from the same color signal and successive sweeps produce respective triplets of lines of respective colors.

2. A color display system as set forth in claim 1 wherein said zones are of generally triangular configuration having overlapping points.

3. A color display system as set forth in claim 1 wherein each of said zones is of figure eight configuration having relatively large lobe and a relatively small lobe, said small lobes being overlapping with the large lobes extending in opposite directions.

4. A color display system as set forth in claim 1 wherein said zones are of generally trapezoidal configuration.

5. A color display system for providing a display in three colors in response to respective color signals, said system comprising:

- a phosphor screen which selectively emits light of said three colors when excited by impinging electron beams;
- electron gun means for emitting a pair of beams of electrons which impinge upon and excite respective, partially overlapping zones of the screen, said zones being offset from one another in one direction along said screen, the number of electrons from each beam impinging within the common overlapping area being substantially equal to one half the number from that beam impinging within the remainder of the respective zone;
- means for repetitively sweeping both of said beams together across said screen whereby the non-overlapping portions of said zones form respective sets of raster lines extending transversely to said one direction with the overlapping portions of said zones effectively providing a third set of raster lines interposed between said respective sets of raster lines, the brightness of said third set of raster lines being substantially equal to the average of the brightnesses of said respective sets of raster lines;
- means for changing on successive line sweeps the color of the light emitted by said screen; and
- means for modulating the beam of electrons emitted from one of said guns in accordance with respective ones of said color signals on successive line sweeps thereby to display said color signals in their respective colors and for simultaneously modulating the beam of electrons emitted from the other one of said guns in accordance with a signal derived from and related to the color signal then being displayed by said one gun whereby each line sweep effectively produces three lines of the same color on said screen all of which are derived from the same color signal and successive sweeps produce respective triplets of lines of respective colors.

6. A color display system as set forth in claim 5 wherein said screen comprises phosphors which emit light of different colors when energized by electrons of different energies.

7. A color display system as set forth in claim 6 in which said means for changing the color of the light emitted by said screen include means for applying different electron accelerating voltages to said screen on successive line sweeps.

8. A color display system as set forth in claim 7 wherein said means for modulating said beams of electrons includes a sequential electronic gate for passing different color signals on successive line sweeps.

9. A color display system for providing a display in three colors in response to respective color signals, said system comprising:

a phosphor screen which selectively emits light of said three colors when excited by impinging electron beams;

electron gun means for emitting a pair of beams of electrons which impinge upon and excite respective, partially overlapping zones of the screen, said zones being offset from one another in one direction along said screen, the number of electrons from each beam impinging within the common overlapping area being substantially equal to one half the number from that beam impinging within the remainder of the respective zone;

means for repetitively sweeping both of said beams together across said screen whereby the non-overlapping portions of said zones form respective sets of raster lines extending transversely to said one direction with the overlapping portions of said zones effectively providing a third set of raster lines interposed between said respective sets of raster lines, the brightness of said third set of raster lines being substantially equal to the average of the brightnesses of said respective sets of raster lines;

means for changing on successive line sweeps the color of the light emitted by said screen;

gate means for providing from said color signals a pair of control signals each of which represents different ones of said color signals during successive line sweep periods, the two control signals representing different color signals at any given instant;

means for delaying one of said control signals by at least one line sweep period so that the other control signal and the delayed control signal represent different portions of the same color signal at any given instant; and means for modulating the beam of electrons emitted from one of said guns in accordance with said delayed signal and for modulating the beam of electrons emitted from the other one of said guns in accordance with said other control signal thereby to display said color signals in their respective colors effectively three lines at a time, the two outer lines representing said other and said delayed control signals respectively and the middle line representing an average of said other and said delayed control signals.

References Cited

UNITED STATES PATENTS 3,204,143 8/1965 Pritchard ---------- 315—13

ROBERT L. GRIFFIN, Primary Examiner

R. L. RICHARDSON, Assistant Examiner